United States Patent Office 3,201,451
Patented Aug. 17, 1965

3,201,451
PURIFICATION OF ACETONITRILE
James D. Idol, Jr., Shaker Heights, and Janice L. Greene, Warrensville Heights, Ohio, assignors to The Standard Oil Company, Cleveland, Ohio, a corporation of Ohio
No Drawing. Filed Mar. 23, 1962, Ser. No. 182,139
6 Claims. (Cl. 260—465.1)

This invention relates to the purification of acetonitrile. More particularly, the invention relates to a process for the removal of acrylonitrile and titratable cyanide impurities from a crude acetonitrile composition. One source of crude acetonitrile containing both acrylonitrile and cyanide impurities is a crude material recovered as a byproduct of the process for the manufacture of acrylonitrile by the elevated temperature reaction of propylene and ammonia in the presence of oxygen described in U.S. Patent 2,904,580 to Idol et al. This byproduct may contain anywhere from about 0.2 to 2 wt. percent but in some instances up to 8 wt. percent titratable cyanide, and from about 0.05 to 1 wt. percent but in some instances up to 10 wt. percent acrylonitrile. This byproduct also contains water in concentrations ranging from about 35 wt. percent down to about 14.2 wt. percent the lower limit approximating the water content of the acetonitrile-water azeotrope at atmospheric pressure.

Attempts to separate acetonitrile from titratable cyanides (especially where present as cyanohydrins) and acrylonitrile impurities, by distillation, have proved to be economically unattractive. We have found, however, that a very effective purification treatment can be accomplished by chemical means. In addition to being economical, our treatment has the procedural advantage of actually employing one impurity to assist in the removal of the other impurity.

According to our invention, the acrylonitrile is converted to less volatile succinonitrile or derivatives thereof, and the titratable cyanides are converted to a stable, nonvolatile ferrocyanide complex salt.

For purposes of this disclosure, titratable cyanides are defined as those cyanides, present in crude acetonitrile as either free hydrogen cyanide or cyanohydrins, which are quantitatively determinable by any standard procedure for titrating cyanide. One such procedure is the Liebig method which employs a silver nitrate reagent in an alkaline medium. A description of this method will be found in Scott's Standard Methods of Chemical Analysis, 5th ed., Van Nostrand, New York, vol. 1, p. 661 (1954). For acrylonitrile analyses, use may be made of the Beesing et al. procedure described in Analytical Chemistry, vol. 31, p. 1073 (1949).

While acrylonitrile will not readily react with either the free hydrogen cyanade or the cyanohydrins present in crude acetonitrile, it will react with sodium cyanide, in the presence of water to form succinonitrile or further derivatives thereof.

$$H_2C=CHCN + NaCN + H_2O \rightarrow NC-CH_2CH_2-CN + NaOH$$

Hence the first step of our purification treatment is to convert all of the titratable cyanides (hydrogen cyanide and cyanohydrins) in the crude acetonitrile to sodium cyanide:

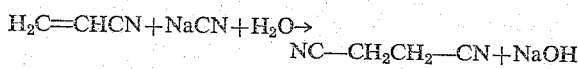

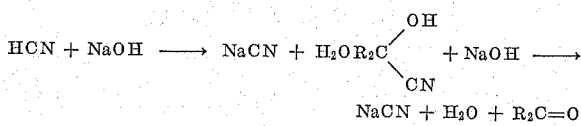

where R is H or a hydrocarbon radical.

At this point, acrylonitrile will begin to be converted to succinonitrile or derivatives thereof as described above. Experience has shown that the crude acetonitrile will almost invariably contain more titratable cyanide than is required to convert all the acrylonitrile to succinonitrile. Therefore, the second step of our purification treatment is to complex the remaining sodium cyanide with ferrous sulfate to form sodium ferrocyanide:

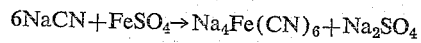

The reagents used in both steps are added to the crude acetonitrile in the form of aqueous solutions to facilitate intermixing and dispersion. For the first step, the caustic addition, simple agitation will affect the conversion of acrylonitrile to succinonitrile or further derivatives thereof. The second step, the ferrous sulfate addition, is preferably accompanied by heating the reagents under reflux until the overhead contains less than the maximum tolerable concentration of titratable cyanide; for most uses, acetonitrile containing a few parts per million titratable cyanide is acceptable.

The third and final step of our purification treatment is the separation of the acetonitrile from the complexed and converted impurities. This may be accomplished in a number of ways, the most straight-forward of which is azeotropic distillation. Either pot heating or steam may be used to drive the distillation column. Care must be exercised to insure that the bottoms temperature does not rise appreciably above the azeotroping temperature lest the cyanide complex decompose, evolve hydrogen cyanide, and recontaminate the purified acetonitrile overhead.

As an alternative route to the recovery of purified acetonitrile, advantage may be taken of the fact that some of the complexed and converted impurities form a sludge from which the aqueous solution of acetonitrile may be separated by filtration or decantation. Depending upon the purity specifications to be met, it may be desirable to azeotropically distill the filtered or decanted effluent to remove so much of the impurities as may have become dissolved therein.

It is generally desirable to employ excess quantities of reagents to insure essentially complete removal of detectable quantities of impurities, i.e., less than 25 p.p.m. tritatable cyanide and less than 100 p.p.m. acrylonitrile. To this end, up to 150% molar excesses of NaOH and FeSO$_4$ may be used to effect the complete conversion of titratable cyanides to sodium cyanide and the complete complexing of sodium cyanide to sodium ferrocyanide, respectively. Even greater excesses may be used but generally cannot be economically justified.

The crude acetonitrile should provide at least a 1:1 molar ratio of titratable cyanide to acrylonitrile and preferably at least a 2:1 to 5:1 molar excess of titratable cyanide, to insure the conversion of all of the acrylonitrile to succinonitrile or further derivatives thereof. Some crudes may have titratable cyanide to acrylonitrile molar ratios of as high as 100:1 and even higher. Such crudes can be readily purified according to the process of our invention. If, however, an insufficient amount of titratable cyanides is present in the crude, the deficiency can be made up either by the addition of sodium cyanide or by crude blending. By this latter scheme, the cyanide deficient crude is blended with another crude which has a relatively high cyanide content and a relatively low acrylonitrile content, whereby the resultant blend will possess the desired cyanide-acrylonitrile molar relationship.

Of course stoichiometric additions of reagents are also contemplated, particularly where minor amounts of impurities can be tolerated and the cost of excess reagents cannot be justified.

Having thus provided a general description of the process of our invention, a description of the best mode contemplated by us for carrying out the invention will now be given.

Example

The crude acetonitrile treated had the following analyses.

| Component: | Concentration (wt. percent) |
|---|---|
| Titratable cyanide (calculated as HCN) | 0.51 |
| Acrylonitrile | 0.11 |
| Acetonitrile | 85.00 |
| Water | 14.38 |

Adjustment of the cyanide content of the crude was not required since the molar ratio of the titratable cyanide (calculated as HCN) to acrylonitrile was approximately 9:1.

7000 gallons of the crude was charged to an 8000 gallon kettle equipped with vapor takeoff and condensing facilities. To the kettle was then charged, with agitation, 150 gallons of 50 wt. percent sodium hydroxide solution. This provided 157% excess of sodium hydroxide beyond that necessary to convert all of the titratable cyanide (calculated as HCN) present in the crude to sodium cyanide. Heating was commenced by means of a steel reboiler circuit.

After 30 minutes, 900 lbs. of ferrous sulfate heptahydrate dissolved in 800 gal. of water were added to the crude while continuing agitation. This provided approximately the 100% excess of ferrous sulfate beyond that needed to complex as sodium ferrocyanide, all of the sodium cyanide remaining after the conversion of acrylonitrile to succinonitrile or derivatives thereof.

Heating was continued to a liquid temperature of 185° F. at which time reflux was occurring. After refluxing for 15 minutes, the overhead condensate stream was sampled. Its cyanide content was 15 p.p.m. After 30 minutes the condensate was again sampled and found to contain less than 10 p.p.m. titratable cyanide. Purified product was then distilled from the kettle. Distillation of product was halted when the pot liquid temperature underwent a sharp temperature rise, indicating the complete removal of acetronitrile as azeotrope.

The recovered purified product analyzed as follows.

| Component: | Concentration |
|---|---|
| Titratable cyanide (calculated as HCN) | Less than 10 p.p.m. |
| Acrylonitrile | Less than 50 p.p.m. |
| Acetonitrile | 80 wt. percent. |
| Water | Approx. 12 wt. percent. |

A material balance of acetonitrile indicated that no significant amount was lost through hydrolysis. This is a surprising aspect of the invention, since it is well known that alkyl nitriles can undergo extensive alkaline hydrolysis. Extremely high yields of purified acetonitrile have been confirmed by small scale laboratory experiments where recoveries in excess of 98% have been consistently achieved.

It will be obvious to persons skilled in the art that various modifications of our process may be made. It is to be understood that we intend to cover all such modifications which reasonably fall within the scope of the appended claims.

We claim:

1. A process for the purification of a crude acetonitrile composition containing both titratable cyanide and acrylonitrile impurities obtained as a byproduct of a process for the manufacture of acrylonitrile by the elevated temperature reaction of propylene and ammonia in the presence of oxygen, which comprises: (a) treating the crude with sodium hydroxide in an amount not less than that theoretically required to convert all of the titratable cyanide to sodium cyanide, whereby the acrylonitrile is converted to succinonitrile and derivatives thereof; (b) further treating the crude with ferrous sulfate in an amount not less than that theoretically required to complex as sodium ferrocyanide, any sodium cyanide remaining after step (a); and (c) separating the purified acetonitrile from the converted and complexed impurities.

2. A process for the purification of a crude acetonitrile composition containing both titratable cyanide and acrylonitrile impurities obtained as a byproduct of a process for the manufacture of acrylonitrile by the elevated temperature reaction of propylene and ammonia in the presence of oxygen, which comprises: (a) adjusting the cyanide-acrylontrile balance in the crude to provide at least one mole of titratable cyanide (calculated as HCN) for each mole of acrylontrile; (b) treating the adjusted crude with sodium hydroxide in an amount not less than that theoretically required to convert all of the titratable cyanide to sodium cyanide, whereby the acrylonitrile is converted to succinonitrile and derivatives thereof; (c) further treating the crude with ferrous sulfate in an amount not less than that theoretically required to complex as sodium ferrocyanide, any sodium cyanide remaining after step (a); and (d) separating purified acetonitrile from the converted and complexed impurities.

3. A process for the purification of a crude acetonitrile composition containing both titratable cyanide and acrylonitrile impurities obtained as a byproduct of a process for the manufacture of acrylonitrile by the elevated temperature reaction of propylene and ammonia in the presence of oxygen in amounts providing at least one mole of titratable cyanide (calculated as HCN) for each mole of acrylonitrile, which process comprises: (a) treating the crude with sodium hydroxide in an amount to provide up to a 150% excess of the amount theoretically required to convert all of the titratable cyanide to sodium cyanide, whereby the acrylonitrile is converted to succinonitrile and derivatives thereof; (b) further treating the crude with ferrous sulfate in an amount to provide up to a 150% excess of the amount theoretically required to complex as sodium ferrocyanide, any sodium cyanide remaining after step (a); and (c) separating purified acetonitrile from the converted and complexed impurities.

4. The process of claim 3 in which step (c) is accomplished by distillation.

5. A process for the purification of a crude acetonitrile composition containing both cyanide and acrylonitrile impurities obtained as a byproduct of a process for the manufacture of acrylonitrile by the elevated temperature reaction of propylene and ammonia in the presence of oxygen, which comprises; (a) adjusting the cyanide-acrylonitrile balance in the crude to provide at least from 2–5 moles of titratable cyanide (calculated as HCN) for each mole of acrylontrile; (b) treating the crude with sodium hydroxide in an amount to provide up to 150% excess of the amount theoretically required to convert all of the titratable cyanide to sodium cyanide, whereby the acrylonitrile is converted to succinonitrile and derivatives thereof; leaving an excess of sodium cyanide; (c) further treating the crude with ferrous sulfate in an amount to provide up to a 150% excess of the amount theoretically required to complex a sodium ferrocyanide, the excess sodium cyanide remaining after step (a); and (d) separating the purified acetonitrile from the converted and complexed impurities.

6. The process of claim 5 in which step (d) is accomplished by distillation.

References Cited by the Examiner

UNITED STATES PATENTS

| 2,434,606 | 1/48 | Carpenter | 260—465.8 |
| 2,653,966 | 9/53 | Taylor et al. | 260—365.9 |
| 2,772,304 | 11/56 | Maffezzoni et al. | 260—465.9 X |

CHARLES B. PARKER, *Primary Examiner.*